United States Patent

Minoura et al.

[11] Patent Number: 5,696,852
[45] Date of Patent: Dec. 9, 1997

[54] IMAGE SIGNAL PROCESSING APPARATUS

[75] Inventors: Nobuo Minoura; Masaaki Kanashiki, both of Yokohama, Japan

[73] Assignee: Canon Kabushiki Kaisha, Tokyo, Japan

[21] Appl. No.: 414,572

[22] Filed: Mar. 31, 1995

Related U.S. Application Data

[63] Continuation of Ser. No. 975,212, Nov. 12, 1992, abandoned, which is a continuation of Ser. No. 687,227, Apr. 18, 1991, abandoned.

[30] Foreign Application Priority Data

| Apr. 27, 1990 | [JP] | Japan | 2-111961 |
| Apr. 27, 1990 | [JP] | Japan | 2-111964 |
| Apr. 27, 1990 | [JP] | Japan | 2-111977 |

[51] Int. Cl.[6] .................................. G06K 9/40
[52] U.S. Cl. .................................. 382/266; 348/625
[58] Field of Search .................................. 382/256, 266, 382/268, 269, 199, 274; 348/625, 627

[56] References Cited

U.S. PATENT DOCUMENTS

| 4,399,461 | 8/1983 | Powell | 382/54 |
| 4,422,094 | 12/1983 | Lewis, Jr. et al. | 358/37 |
| 4,811,100 | 3/1989 | Umezawa | 358/166 |
| 4,849,826 | 7/1989 | Ohta | 358/166 |
| 4,994,915 | 2/1991 | Takahashi et al. | 358/166 |
| 5,151,787 | 9/1992 | Park | 358/162 |

FOREIGN PATENT DOCUMENTS

| 0201245 | 12/1986 | European Pat. Off. |
| 0340648 | 11/1989 | European Pat. Off. |
| 62-299180 | 6/1986 | Japan |

*Primary Examiner*—Yon J. Couso
*Attorney, Agent, or Firm*—Morgan & Finnegan LLP

[57] ABSTRACT

An image signal processing apparatus of the present invention is an apparatus to process image signal, wherein an input image signal is corrected and made into a sharp and visually preferred image signal through such composition that an outline correction signal which has been non-linearly processed corresponding to the outline section of the input image signal is formed, the formed outline section correcting signal is added to the delayed image signal to be output.

22 Claims, 10 Drawing Sheets

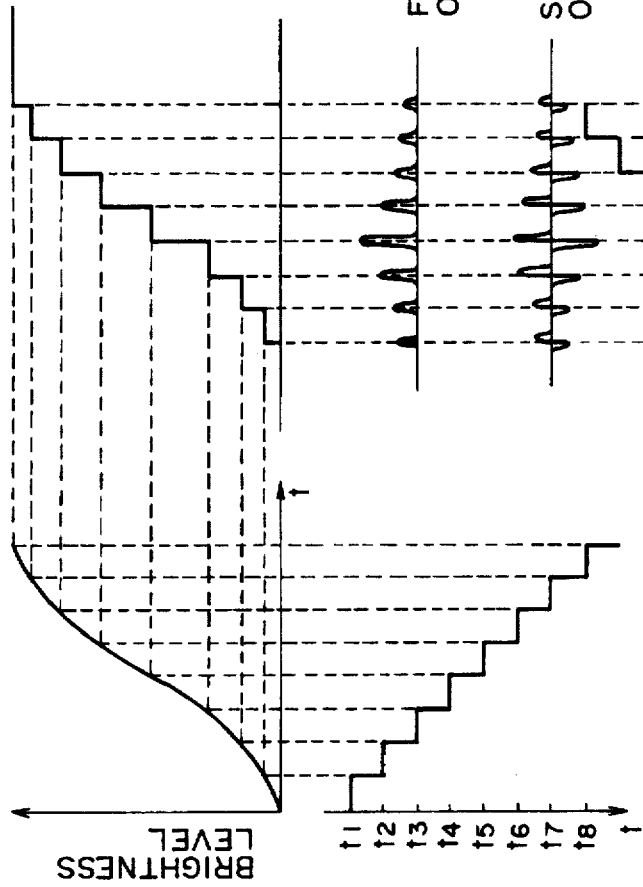
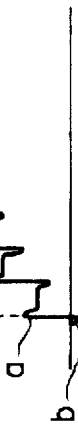

IMAGE SIGNAL PROCESSING APPARATUS

This is a continuation of Ser. No. 975,212, filed Nov. 12, 1992, abandoned, which is a continuation of Ser. No. 687,227, filed Apr. 18, 1991, abandoned.

BACKGROUND OF THE INVENTION

1. Field of the Invention

The present invention relates to an image signal processing apparatus to process an image signal.

2. Related Background Art

There is already known an image signal processing apparatus which improves the image quality of TV image receiver as the image signal processing apparatus.

As the method to improve picture quality of TV image receiver, there is known the method to improve picture quality by improving the frequency characteristics of the image amplifying circuit or by the system of delay type outline correction circuit.

FIG. 1 indicates the example of the basic composition of the conventional outline correction circuit.

In FIG. 1, the input image signal receives adjustment of brightness and contrast at the brightness/contrast adjusting circuit 1 and then it is supplied to the outline signal forming circuit 2 and delay circuit 3.

At outline signal forming circuit 2, the signals corresponding to the outline section of the image among all the input signals of the image are extracted and they are supplied to the gain control circuit 4 at the later stage.

Gain control circuit 4 is so constructed that it can control the gain of the outline signal which is supplied by the operating unit not shown in the drawing and the outline signal with thus controlled gain is supplied to the adder 5.

To the adder 5 is also supplied the image signal whose brightness and contrast have been adjusted by the brightness/contrast adjusting circuit 1, after being delayed for preset time by the delay circuit 3 and by further addition of the outline signal supplied by the gain control circuit 4 and the image signal supplied by the delay circuit 3, the image signal with corrected outline is output at the said adder 5.

FIG. 2 shows an example of the composition of horizontal outline correction circuit while FIG. 3 is the drawing to indicate the signal waveform of the unit with the composition shown in FIG. 2.

In FIG. 2, image input signal (A) gives the image signal output to which the outline signal shown in FIG. 3(G) has been added by the delay circuit 7, 10, 13, coefficient multiplier 6, 8, 11 and adder 9, 12, 14.

However with the aforesaid conventional outline correction circuit, when certain correction amount is set, the same outline correction is made irrespective of the brightness level (dark part, bright part) of the image signal and consequently, should the outline be over-emphasized, outline emphasis becomes too remarkable at dark scene producing glittering image, while at the bright scene, particularly where white letter etc. is produced, Braun's tube becomes in the state of blooming and such phenomenon as white collapse occurs, resulting in the deterioration of picture quality.

Further more, in the case of the TV receiver, when signal processing is executed when the signals are in analogue state in the modulation of scanning speed of electron beam of image receiving tube by the outline signal formed by the input image signal, in order to improve sharpness of the image, it is unavoidable that the system becomes costly due to employment of many delay lines, differential circuits etc. and performance becomes unstable due to the fluctuation of temperature, humidity or degeneration occurring with elapse of time.

A method to emphasize the outline of the image by digitalizing the image signal, has been proposed by Japanese Patent Application Laid-Open No. 59-23974.

However in the case of such conventional method, a delay circuit where plural number of delay signals each of which is deviated in timing by one horizontal scanning period is employed, the correlation of plural number of delay signals output by the said delay circuit is calculated and the signals corresponding to such correlation are output, thus plural number of costly line memories are required, resulting in the increase of cost and besides, since outline emphasis is made corresponding to such correlations by calculating the correlation between image signals in each horizontal scanning period, such problem occurs that sufficient outline emphasis can not be made depending on the contents of the image.

SUMMARY OF THE INVENTION

The objective of the present invention is to provide the image signal processing apparatus which can solve the aforesaid problems.

An object of the present invention is to provide the image signal processing apparatus which can correct the image signal into such image signal as having visually preferred picture quality.

For such object, the present invention takes an embodiment of the present invention wherein;

the image signal processing apparatus is presented which comprises the means for inputting an image signal, forming and outputting the outline part correction signal having been given with non-linear processing corresponding to the outline part of the input image signal, delay means for inputting an image signal and delaying and outputting the input image signal and adder means for adding the outline part correction signal which has been output by the outline part correction signal generating means to the image signal output by the delay means.

Still other object of the present invention is to provide an image signal processing apparatus which can execute outline emphasis processing of the image in proportion to the image signal.

For such object, the present invention proposes an image signal processing apparatus as an embodiment, comprising; a non-linear means for inputting image signal, non-linearly processing the input image signal and outputting it, outline part signal forming means for forming the signal of outline part from the signal to be output by the non-linear means; delay means for inputting the image signal and delaying the input image signal so that it should synchronize with the timing at which outline part signal corresponding to the image signal is output by the said outline part signal forming means and for outputting it and the adding means for adding the outline part signal output by the output part signal forming means on the image signal to be output by the delay signal and output the result of such addition.

Still another object of the present invention is to provide an image signal processing apparatus which can execute outline emphasis processing of the image signal without relying on the correlation of the images.

The image signal processing apparatus of the present invention which processes an image signal, comprises analogue/digital conversion means for inputting the image signal, forming the image data by sampling the input image signal by the preset sampling frequency and digitalizing it and for outputting such image data; delay means for delaying, for preset period, the image data output by the analogue/digital converter means and for outputting such data; correction data generating means for forming the correction data according to the image data corresponding to the difference between the image data output by the analogue/digital conversion means and the image data output by said delay means and for outputting such correction data; adding means for adding the image data output by the delay means to the correction data output by the correction data forming means and for outputting such data and the digital/analogue conversion means for converting the image data output by the adding means into analogue signal and for outputting it.

Still another object of the present invention is to provide an image signal processing apparatus which can display the image with high degree of sharpness.

The image signal processing apparatus of the present invention which processes an image signal comprises; analogue/digital conversion device for inputting the image signal, for forming image data by sampling the input image signal by the preset sampling frequency and digitalizing it and for outputting such data; delay means for delaying, for preset period, the image data output by the analogue/digital converting means and for outputting such delayed data; the correction signal generating means for forming correction signal using the image data corresponding to said differential value according to the difference between the image data output by the analogue/digital conversion means and the image data output by said delay means and for outputting such correction signal; analogue/digital conversion means for converting the image data output by the delay means into analogue signal and for outputting it and the display device in which the formation speed of said scanning line is modulated by the correction signal output by the correction signal generating means at the time when the scanning line corresponding to the image signal output by the digital/analogue conversion means is formed.

The objects of the present invention other than the above and their characteristics shall be made clear by the detailed descriptions of the form of the invention in reference to the drawings that follow hereunder.

BRIEF DESCRIPTION OF THE INVENTION

FIG. 7A-7G are the drawings to show the non-linear characteristics of non-linear circuit of the outline correction circuit and signal waveforms at each unit shown in FIG. 5 above.

DESCRIPTION OF THE PREFERRED EMBODIMENTS

The present invention shall be described in reference to the embodiment.

Figure 4:
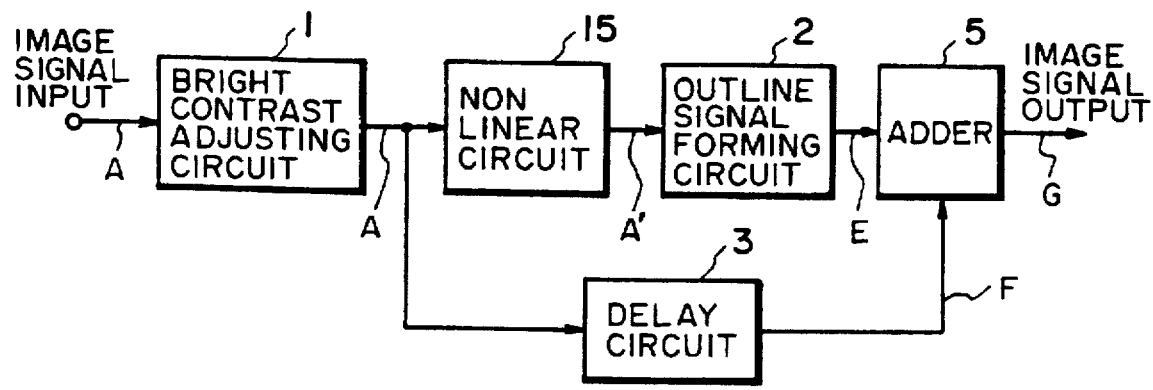
FIG. 4 is the drawing to show the composition of the outline correction circuit as a first embodiment of the present invention.

FIG. 4 shows the composition of the outline correction circuit representing the first embodiment. In FIG. 4, element 1 is bright contrast adjusting circuit, 2 is profile signal formation circuit, 3 is delay circuit, 5 is adder and 15 is non-linear circuit.

In FIG. 4, the input image signal is supplied to the brightness/contrast adjusting circuit 1 to execute adjustment of brightness and contrast. The image signal A which is given by such adjustment of brightness and contrast is fed to the non-linear circuit 15 and delay circuit 3 and the image signal F which has been delayed by 3 is supplied to adder 5.

Figures 5A, 5B, 5C, 5D, 5E:
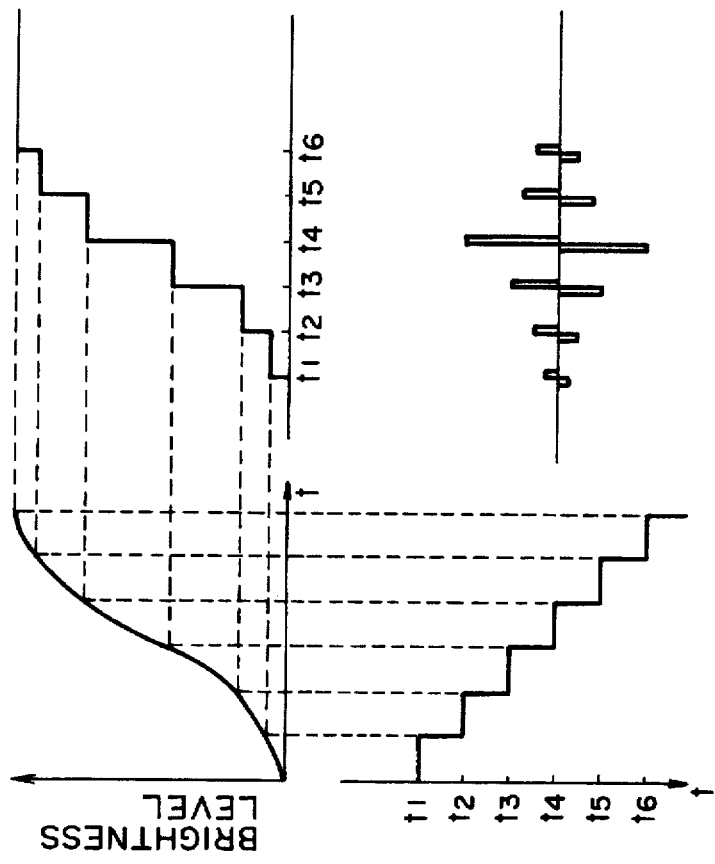
FIGS. 5A-5E are the drawings to show the non-linear characteristics at non-linear part of the outline correction circuit and signal waveforms at each unit shown in FIG. 4 above.

Non-linear circuit 15 has the non-linear characteristics as shown in FIG. 5A and assuming that the stepped waveform image signal as shown in FIG. 5B is supplied to the said non-linear circuit 15, the image signal having the waveform as shown in FIG. 5C is output by the said non-linear circuit 15.

As stated above, the image signal given out by the non-linear circuit 15 has such characteristics that, as shown in FIG. 5C, the signal level is compressed for the signal indicating the dark area of the image (i.e., the area where signal level is small) and the signal indicating the bright area of the image (i.e., the area where signal level is large), while the signal level is expanded for the signal indicating the area where the brightness of the image is medium (i.e., at around the area where signal level is medium).

The image signal indicated in FIG. 5C is supplied to the outline signal forming circuit 2 and outline signal E as shown in FIG. 5D is output by the outline signal forming circuit 2 and fed to the adder 5.

At adder 5, by adding the outline signal E supplied by outline signal forming circuit 2 and the image signal F delayed for certain time by the delay circuit 3, the image signal G of which the outline is emphasized as shown in FIG. 5E is output.

As stated above, by providing the non-linear circuit 15 prior to the outline signal forming circuit 2, it is possible to suppress the amount of outline emphasis for the signals representing the dark part and bright part of the image and realize the optimum outline emphasis in a wide range from dark scene to the bright scene of the image and thus glittering in the dark scene or blooming (smashing of white or blurr) in the bright scene etc. are prevented and at the scene where the brightness is normal, an appropriate emphasis of the outline obtained.

Figure 1:
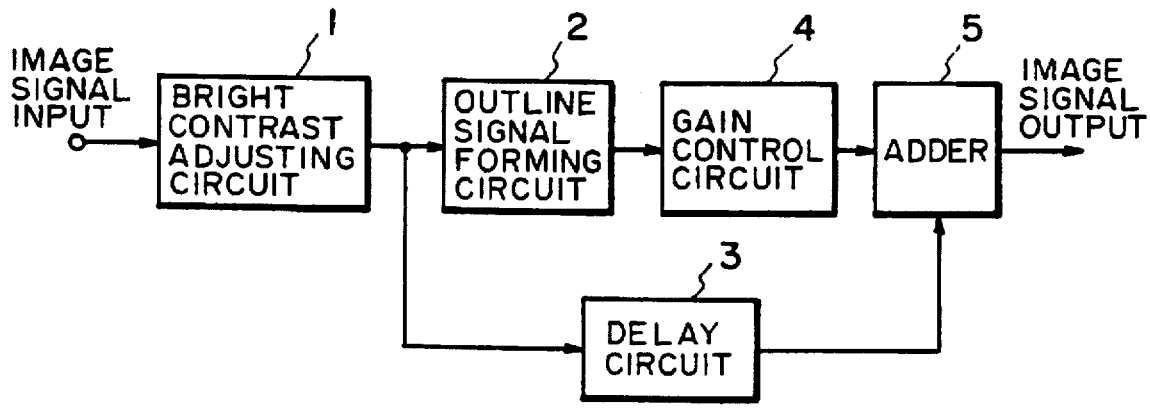
FIG. 1 is the drawing to show the basic composition of the conventional outline correction circuit.
Figure 2:
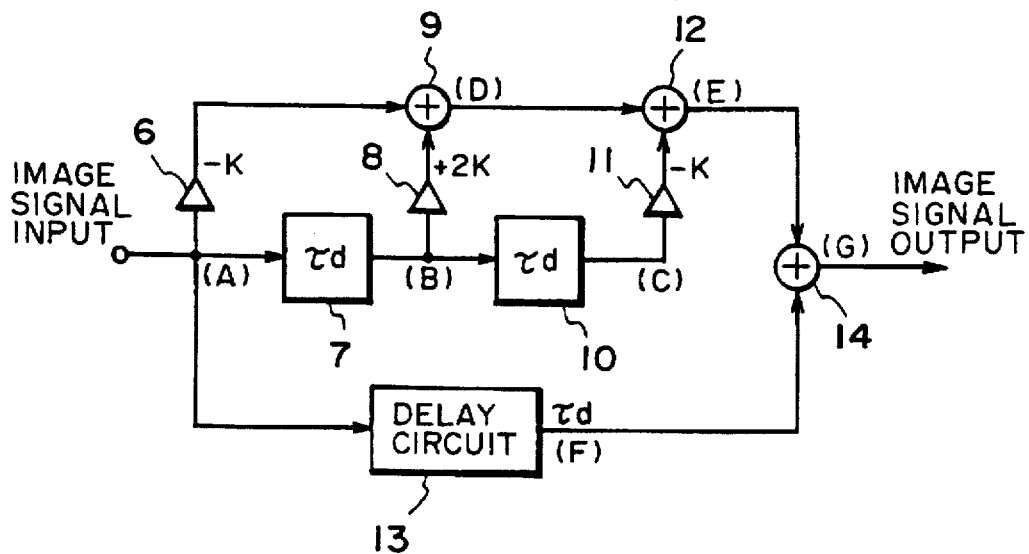
FIG. 2 is the drawing to show the composition of the conventional horizontal outline correction circuit.
Figure 3:
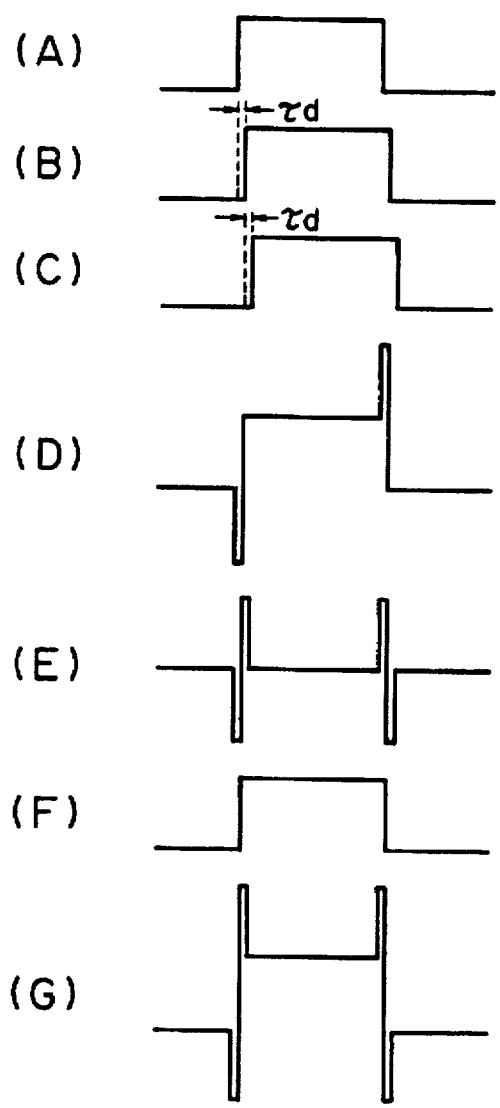
FIG. 3 is the drawing to show the signal waveform of various parts of horizontal outline correction circuit shown in the said FIG. 2.

In FIG. 1, the elements which are equivalent in the composition to those of FIG. 1 are given the same code number.

Hereunder is described another embodiment of the present invention.

Figure 6:
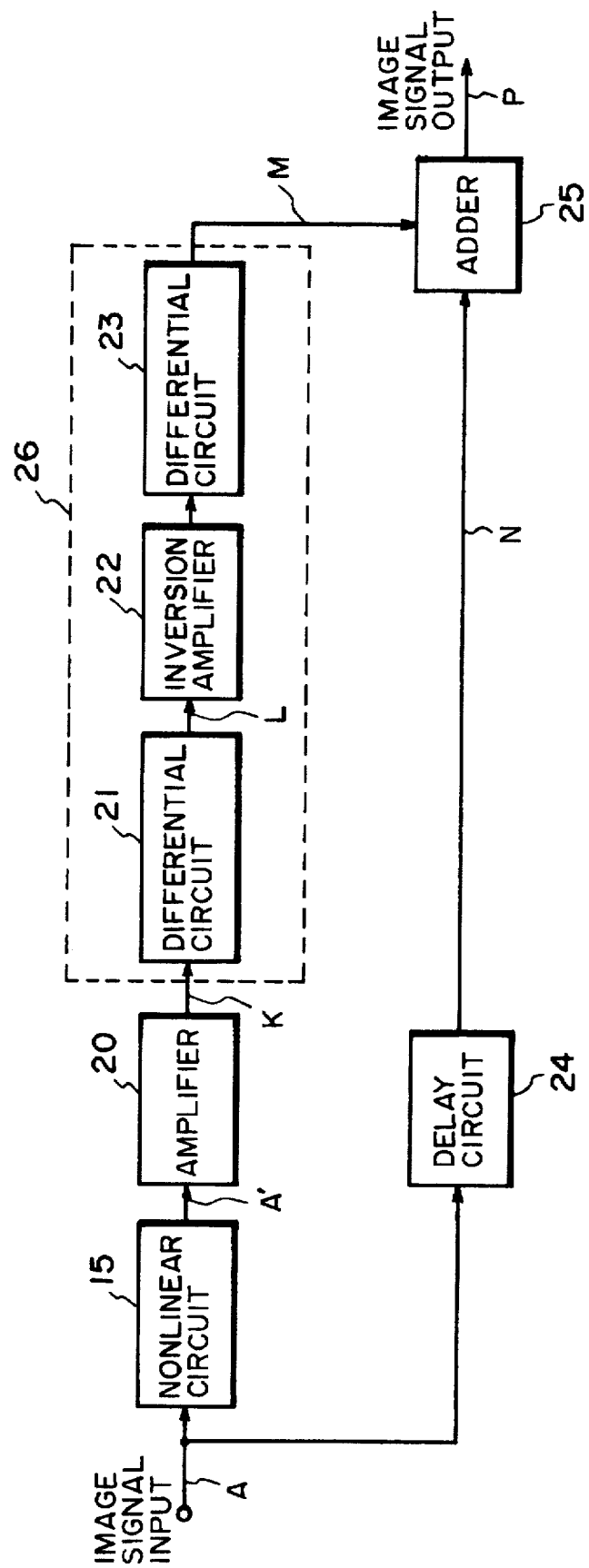
FIG. 6 is the drawing to show the composition of the outline correction circuit of an another embodiment of the present invention.

FIG. 6 is the drawing to show the composition of the outline correction circuit of such other embodiment. In FIG. 6, element 15 is a non-linear circuit; 20 is an amplifier, 21, 22 are differential circuit; 22 is reversal amplifier; 24 is delay circuit and 25 is adder.

In FIG. 6, image input signal A (see FIG. 7B) is given the signal waveform as shown in FIG. 7C by the non-linear circuit having the charateristics shown in FIG. 7A, amplified by amplifier 20, supplied to the outline signal forming circuit 26 which is composed of differential circuit 21, 23 and reversal amplifier 22 and the signal with such waveform as shown by FIG. 7C is formed by the said outline siganl forming circuit 26. On the other hand, input image signal A is delayed by the delay circuit 24 and supplied to adder 25.

As stated above, the output signal M of the outline signal forming circuit 26 (see FIG. 7E) and output signal N of delay circuit 24 (see FIG. 7F) are supplied to adder 25 and by adding these two, the image signal P (see FIG. 7G) which had been given the outline correction is obtained. As shown in FIG. 7G, according to the present embodiment, overshoot (c in the Figure) and preshoot (b in the Figure) are added to the input image signal and thus it is possible to display the image with even better sharpness.

As described above, under the outline correction system for improvement of picture quality of TV receiver, the degeneration of apparent picture quality caused by the change of the size of the signal input, for example, overemphasis of the outline in the dark scene or blooming phenomenon in the bright scene is suppressed and in the ordinary case, dynamic outline correction is automatically executed such as sufficient outline emphasis and as the result, it is possible to always display the image of preferred quality.

Hereunder is described the second embodiment of the present invention.

Figure 8:
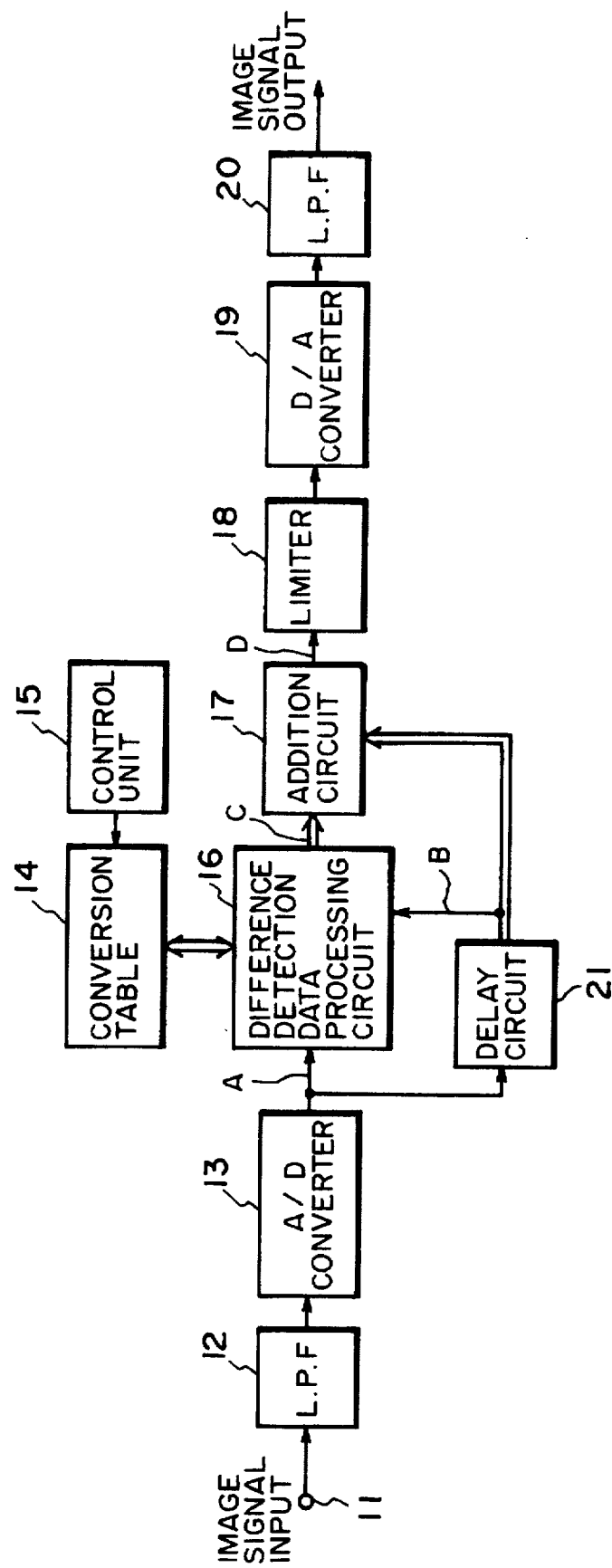
FIG. 8 is the drawing to show the composition of the outline correction circuit as a second embodiment of the present invention.

FIG. 8 is the drawing to show the composition of the outline correction circuit representing the second embodiment of the present invention. In FIG. 8, element 11 is the input terminal of image signal; 12 is the low-pass filter (LPF) for limiting the hand width to digitalize image signal; 13 is the analogue/ditigal (A/D) converter to change analogue signal into digital signal; 14 is the converter table to change digital signal into other digital signal which has the non-linear chracteristics and is composed of RAM (random access memory) to enable rewriting of the value of conversion table (non-linear characteristics).

Element 15 is the control unit to supply the data for rewriting the value of the aforesaid conversion table 14 in order to obtain the outline emphasis preferred by the operator.

Element 16 is the difference detection data processing circuit which compares the present image data with the image data one sample period prior thereto, forms the differential value data and when thus formed differential value data are smaller than the preset differential value level or when the polarity of the differential value data is reversed, adds the data of the same value but with reversed polarity to the said differential value data at the timing one sample period delayed; 17 is the adder circuit to add the differential value data output by the said difference detection data processing circuit 16 to the image data delayed by the delay circuit 11 to be stated later; 18 is the limiter circuit which prevents the image data output by the said adder circuit 17 exceed the black level peak (i.e., minimum value) or white level peak (i.e., maximum value), 19 is the digital/analogue (D/A) converter to convert the image data output by the said limiter circuit 18 into analogue signals; 20 is the low pass filter to limit the image signal to be output by the said D/A converter 19 within the desired band width and 21 is the delay circuit to delay the image data by one sample period.

In FIG. 8, the band width of the image signal input by input terminal 11 is limited within the desired range by LPF12 and then it is converted into digital signal by A/D converter 13 and supplied to the difference detection data processing circuit 16.

The difference detection data processing circuit 16 receives the present image data supplied by the said A/D converter 13 and the image data one sample period prior thereto which have been delayed by one sample period by the circuit 21 and the differential value data are comparatively detected.

Figure 10:
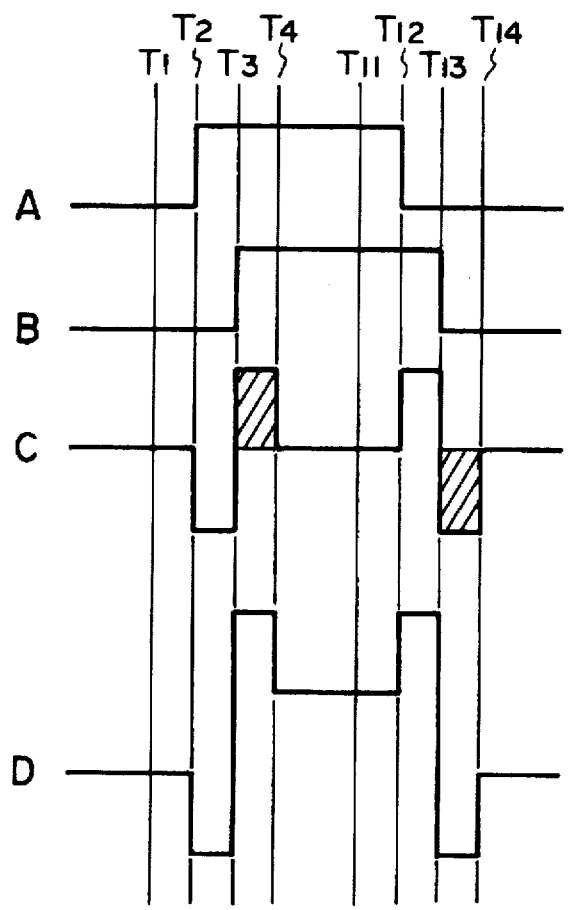
FIGS. 10, 11 and 12 are the drawings to show the signal waveforms at each part of the outline correction circuit shown in FIG. 8 above.

As shown in FIG. 10, differential value data C (except the part marked by diagonal lines in the figure) is obtained by subtracting the present image data A from the image data B which have been delayed by one sample period. ($T_1, T_2, T_3, T_4$ and $T_{11} \ldots T_{14}$ in the figure indicate the timing of sampling).

Figure 9:
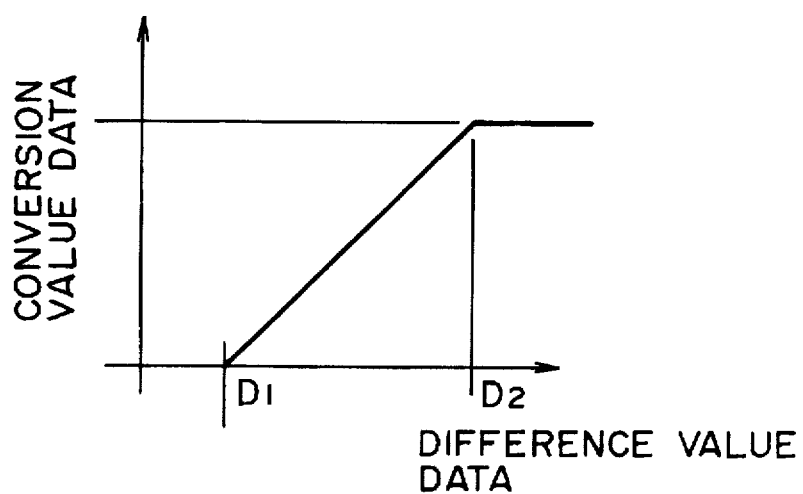
FIG. 9 is the drawing to show the non-linear characteristics at the conversion table of outline correction circuit shown in FIG. 8 above.

Differential value data obtained from difference detection data processing circuit 16 of FIG. 8 are given non-linear conversion according to the conversion table 14. Non-linear conversion characteristics of the said conversion table 14 are such that, as shown in FIG. 9, when the level of the differential value data is lower than $D_1$ in the figure, it is converted into the conversion value data indicating "0" and when the level of the said differential value data is higher than $D_2$ in the figure, they are converted into the conversion value data indicating the preset level.

Non-linear characteristics of the conversion table 14 use the RAM (random access memory) so that the composition can be changed in such way that they fit the outline emphasis level preferred by the operator according to the instruction given by the control unit 15.

When the differential value data formed by the difference detection data circuit 16 and conversion table 14 (FIG. 10C) are lower than the preset differential value level or their polarity is reversed, the data with the same level but with the reversed polarity to such differential value are added thereto at the timing one sample period later and they are output at the difference detection data processing circuit 16.

In other words, the difference detection data processing circuit 16 outputs the differential value data added with the part marked by diagonal lines in FIG. 10C. Such differential value data C are supplied to the adder circuit 7 while to such adder circuit 17 are already added the image data B having been delayed for one sample period by the delay circuit 21 and by addition of these two data, the image data D which are emphasized of the outline are formed and they are supplied to the limiter circuit 18.

At the limiter circuit 18, the image data are so limited that they become in between the white peak level (i.e., the maximum value of image data) and the black peak level (i.e., the minimum value of image data or when the said image data include the data obtained by digitalizing the synchronized signals, the value level which is lower than the pedestal level shown by the image data but within the range where synchronization does not become unstable) and thus limited data are output, converted into analogue signal at D/A converter 19, limited by LPE20 for their band and are output as the image signals with emphasized outline.

Figures 11, 12:
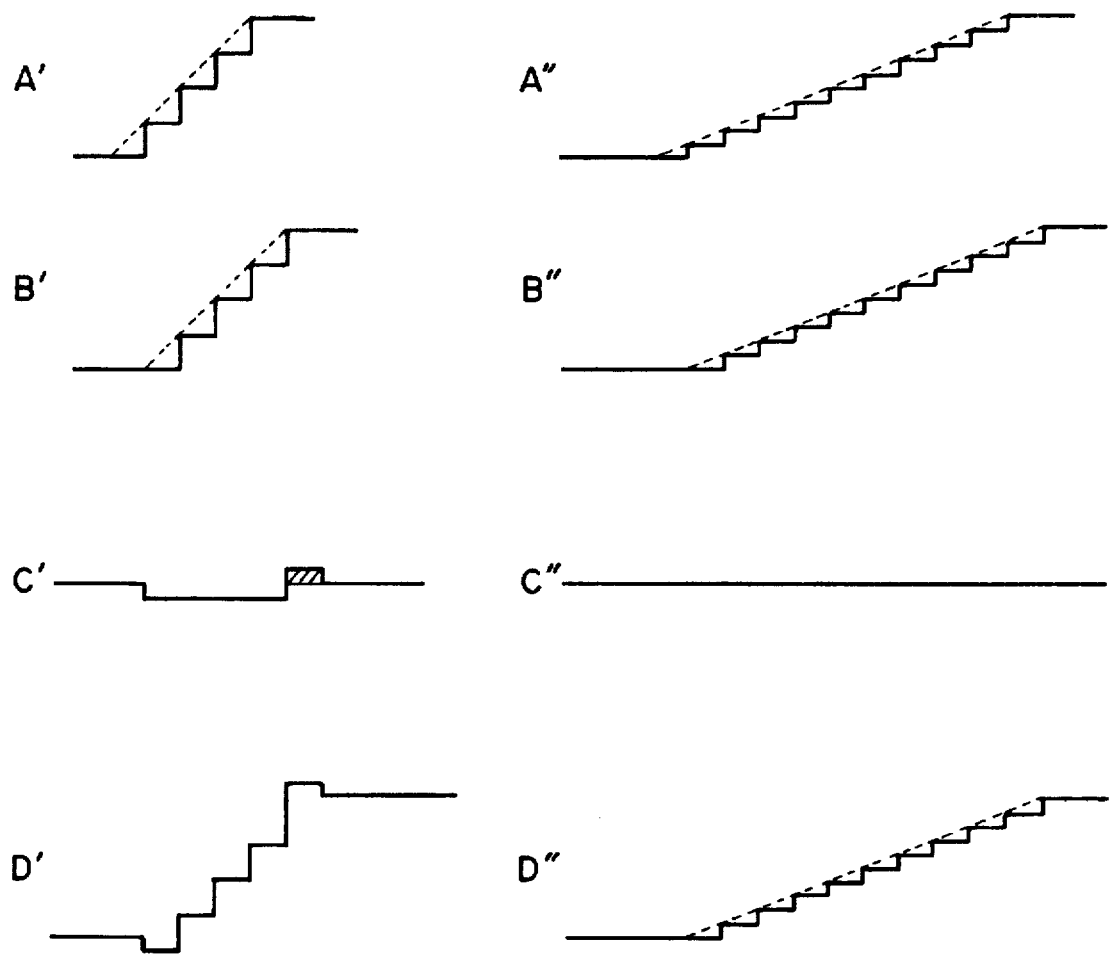

FIG. 11 shows the signal waveforms at various units when the image signals having medium range frequency band and rising radically are input into the device shown in FIG. 8, while FIG. 12 shows the signal waveforms at various units when the image signals having the frequency band lower than the image signals indicated in FIG. 11 and rising moderately are input. As shown in FIG. 12, outline emphasis is not made on the moderately canning image signals and therefore there is no change of deterioration of picture quality.

As explained above, by employing such composition that after digitalizing the image signals, the differential value between the present image data and the image data one sample period before is detected and outline emphasis is given according to the level of thus detected differential value, a high quality outline emphasis can be made at low cost without relying on the correlation between the horizontal scanning periods of the image signal.

Hereunder is described the embodiment 3 of the present invention.

Figure 13:
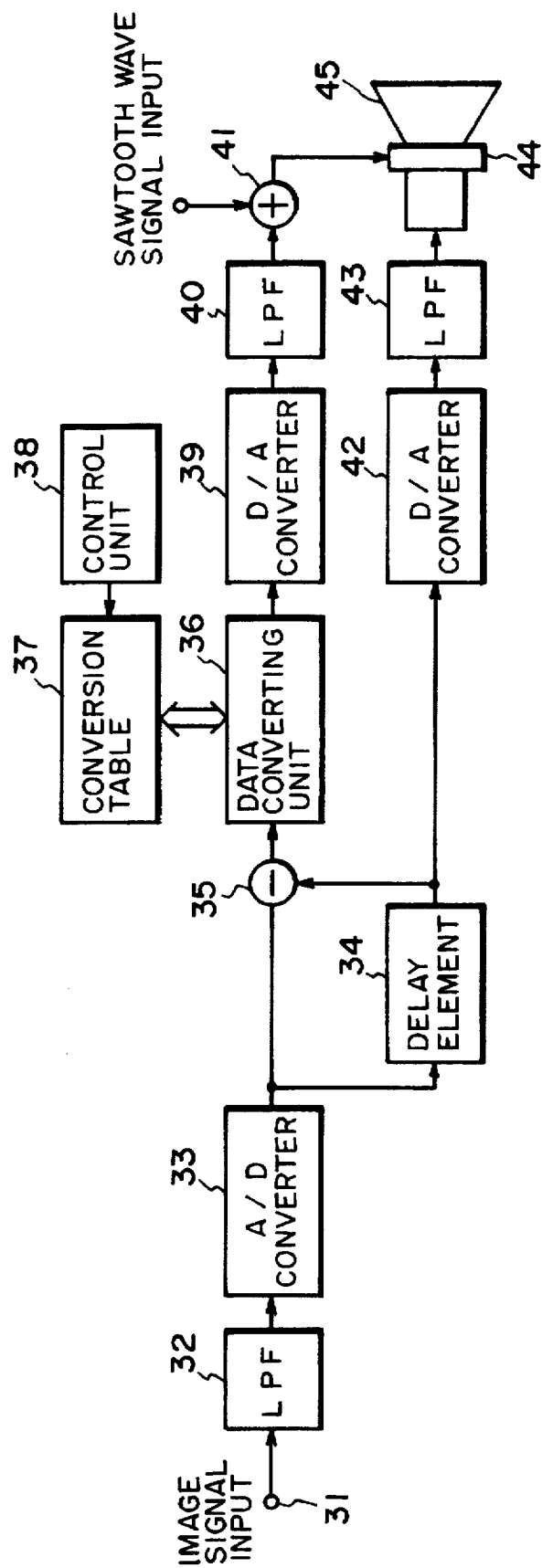
FIG. 13 is the drawing to show the outline of the composition of the TV receiver to which the present invention is applied, as a third embodiment of the present invention.
Figure 14:
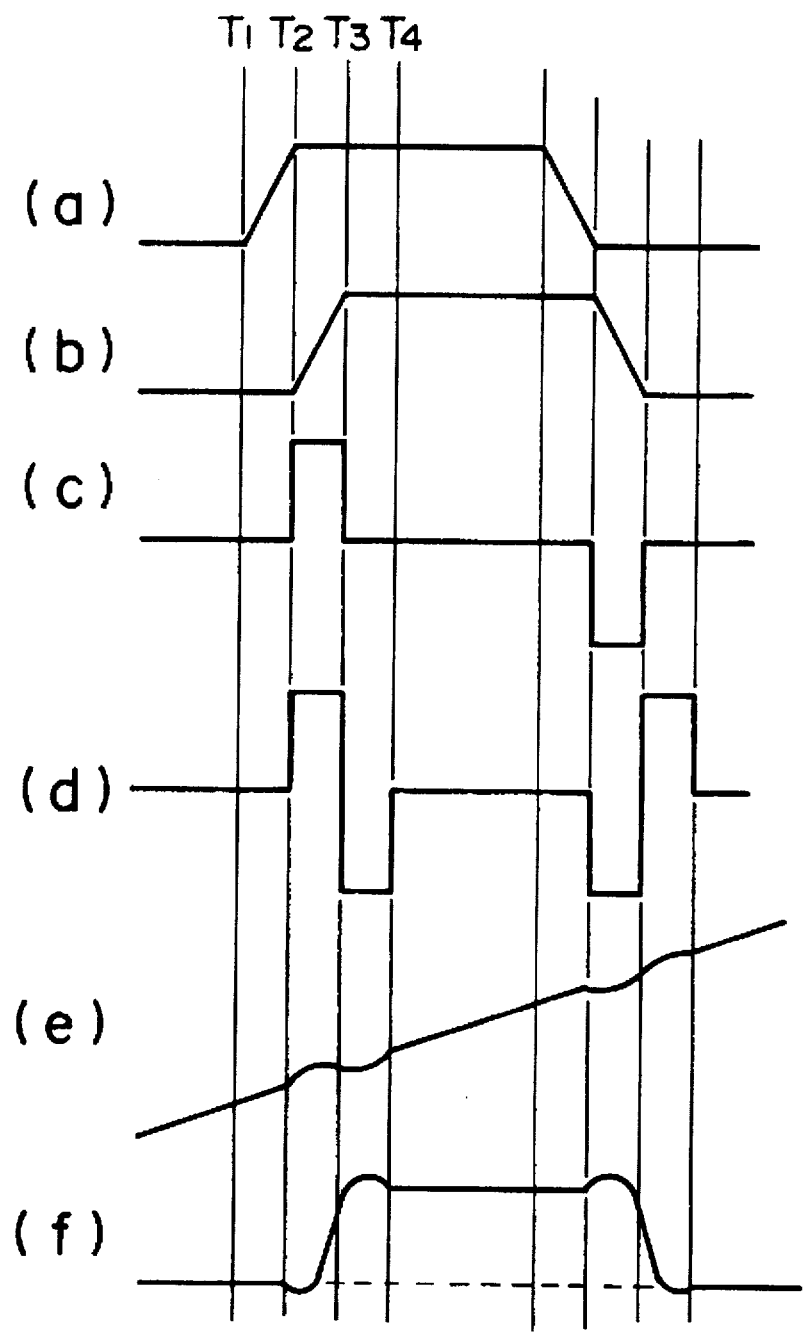
FIG. 14 is the timing chart to explain the performance of TV receiver shown in FIG. 13 above.

FIG. 13 is the drawing to show the schematic composition of the TV image receiver to which the present invention has been applied, which represents the third embodiment of the present invention while FIG. 14 is the timing chart to describe the performance of the composition of the said FIG. 13.

In FIG. 13, the element 31 is the image signal input terminal; 32 is the low pass filter (LPF) which, at the digitalization of the input image signal, limits the said image signal into the desired band; 33 is the analogue/digital (A/D) converter and 34 is the delay device to delay the digital signal output by said A/D converter 33 which comprises for example a memory.

Element 35 is the subtractor to obtain the differential value between the digital signal formed at the said A/D converter 33 and the digital signal formed one sampling period before; 36 is the data conversion unit to convert the difference value output by the said subtractor 35 based on the conversion data memorized at the conversion table 37 which is stated later; 37 is the conversion table memorizing the conversion data used for non-linear conversion of the difference value output by the said subtractor 35, the said conversion table being composed of RAM (Random Access Memory).

Element 38 is the control unit to instruct rewriting of the conversion data to be memorized by the said conversion table 37 in order to obtain the picture quality designated by the operator; 39 is the digital/analogue (D/A) converter to convert the signal having been given non-linear conversion by the said data conversion unit 36 into analogue signal; 40 is the low pass filter (LPF) which limits the band of the signal output by the said D/A converter 39 into the desired band; 41 is the adder to add the signal output by the said LPF40 and the sawteeth wave signal for horizontal deflection; 42 is the digital/analogue (D/A) converter to convert the digital signal delayed by delay device 34 into analogue signal; 43 is the low pass filter (LPF) to limit the band of the signal output by the said D/A converter into the desired band; 44 is the deflection coil to deflect the electron beam modulated by the image signal; 45 is the image receiving tube (CRT) to display the image corresponding to the image singal.

Hereunder is described the performance of the composition shown in FIG. 13.

In FIG. 13, the image signal input by the input terminal 31 is limited to the desired band by LPF32 and converted into digital signal by the A/D converter 33 which functions in synchronization with the sampling timing ($T_1, T_2, T_3 \ldots$ in the figure) shown in FIG. 14 and the image data output by the said A/D converter 33 (see FIG. 14a) are supplied to the subtractor 35 and delay device 34.

Then, the differential value (see FIG. 14(c)) between the signal being output by A/D converter 33 and the signal delayed for one sampling period by the said delay device 34 (see FIG. 14(b)) is output at the said subtractor 35.

Differential value data output by the said subtractor 35 are the data non-linearly converted by the data conversion unit 36 based on the conversion data memorized by the conversion table 37.

Here, the characteristic example of non-linear conversion according to the conversion table 37 of FIG. 13 shall be identical with the characteristics shown in FIG. 9 of the aforesaid embodiment 13.

As shown in the aforesaid FIG. 9, non-linear conversion characteristics of the said conversion table 37 are such that when the level of the differential value data supplied is larger than the preset value ($D_2$ in the figure), conversion value data of preset level is output.

The said conversion table 37 is composed of RAM stated above and it is so arranged that the conversion data which determines the non-linear characteristics according to the instruction of the control unit 38 of FIG. 13 can be rewritten and it is possible to set the conversion data according to the instruction of the operator.

As the aforesaid data conversion unit 36, the differential value data non-linearly converted according to the conversion data memorized by the said conversion table 37 are added to the differential value data non-linearly converted as aforesaid, delayed by one sampling period and having the signal waveform with reversed polarity (see FIG. 14(d)).

As aforesaid, the signal formed at the said data conversion unit 36 is converted into an analogue signal by D/A converter 39, its band being limited by LPF40 and added with the sawteeth wave signal for horizontal deflection at adder 41 (see FIG. 14(e)) and supplied to deflection coil 44.

On the other hand, the image data being output by the said delay device 34 is converted into analogue signal by D/A converter 42, its band being limited by LPF43 and supplied to CRT45 while the electron beam modulated by the image signal output by the said LPF43 is horizontally deflected by the said deflection coil 44.

As aforesaid, by modulating the scanning speed of electron beam of CRT, the difference in brightness becomes clearer at the part where the brightness components of the image signal radially change and thus the shapness of the image indicated by CRT increases.

As shown in the present embodiment, by so constructing the system that the input image signals are processed digitally, the action timing of the device is controlled to be synchronized with the sampling block and the action becomes extremely stable while by rewriting the contents of conversion table memorizing the conversion data for setting the non-linear characteristics which determine the sharpness, the picture quality designated by the operator is easily obtained.

In the case of the TV signal receiver used in recent years, employment of digital system has considerably advanced and therefore it is possible to increase the sharpness of image displayed on CRT by a simple composition without increasing the cost, only by addition of delay device 34, subtractor 35, data converter 36, conversion table 37 and control unit 38 etc. as shown in FIG. 13.

As described above, according to the present embodiment, it is possible to provide a TV receiver which can display the TV image of high sharpness with stability by a simple and low cost composition.

What is claimed is:

1. An image signal processing apparatus to process an image signal, comprising:
   (a) outline correction signal generating means for inputting an image signal and for forming an outline correction signal by extracting an outline part of a non-linearly processed input image signal, said outline correction signal generating means including:
      non-linear means for inputting the image signal, for compressing the signals of dark part and bright part of the input image signal and expanding the signal for medium level; and
      outline correction signal forming means for forming the outline correction signal from the signal output by said non-linear means, wherein said outline correction signal forming means further includes:
         a first differential circuit which differentiates the signal output by said non-linear means and for outputting the differentiated signal;
         a phase reversing circuit which reverses the phase of the signal being output by said first differential circuit and outputs the signal with reversed phase; and
         a second differential circuit which differentiates again the signal being output by said phase reversing circuit and outputs thus differentiated signal;
   (b) delay means for delaying the input image signal; and
   (c) adding means for adding the outline correction signal output by said outline correction signal generating means with the image signal being output by said delay means.

2. An image signal processing apparatus to process an image signal, comprising:
   (a) outline correction signal generating means for inputting an image signal and for forming an outline correction signal by extracting an outline part of a non-linearly processed input image signal, said outline correction signal generating means including:
      differential value signal forming means for inputting the image signal and for forming the differential value signal corresponding to the differential value between the input image signal and the signal delayed by said delay means; and
      outline part correction signal forming means for conducting non-linear processing of the differential value signal being output by said differential value signal forming means and for forming the outline correction signal from the signal having been non-linear processed;
   (b) delay means for delaying the input image signal; and
   (c) adding means for adding the outline correction signal output by said outline correction signal generating means with the image signal being output by said delay means.

3. An image signal processing apparatus according to claim 2, wherein said delay means is arranged so as to delay the input image signal for a predetermined period and output the delayed signal.

4. An image signal processing apparatus to process an image signal, comprising:
   (a) non-linear means for inputting an image signal, for non-linearly processing said input image signal and for outputting the processed signal;
   (b) outline signal forming means for extracting an outline signal from the signal being output by said non-linear means, said outline signal forming means including
      a first differential circuit which differentiates and outputs the signals output by said non-linear means;
      a phase reversing circuit which reverses the phase of the signal output by said first differential circuit and outputs the signal thus processed; and
      a second differential circuit which differentiates the signal output by said phase reversing circuit;
   (c) delay means for inputting an image signal, and for delaying the input image signal so that the input image signal synchronizes with the timing of output of the outline part signal corresponding to said image signal, by said outline signal forming means; and
   (d) adding means for adding the outline part signal being output by said outline signal forming means with the image signal being output by said delay means and for outputting the result of the addition.

5. An image signal processing apparatus to process an image signal, comprising:
   (a) analogue/digital conversion means for inputting an image signal, for sampling the input image signal at a predetermined sampling frequency, and for forming the image data by digitalizing the sampled signal to be output;
   (b) delay means for delaying the image data output by said analogue/digital converting means by a predetermined period and for outputting the result;
   (c) correction data generating means for calculating differential value data representative of a value of difference between a level represented by the image data output from said analogue/digital conversion means and a level represented by the image data output from said delay means and for forming and outputting correction data by performing a non-linear processing on said differential value data;
   (d) adding means for adding the image data output by said delay means and the correction data output by said correction data generating means; and
   (e) digital/analogue conversion means for converting the image data output by said adding means and for outputting the converted data.

6. An image signal processing apparatus according to claim 5, further comprising level limiting means for limiting the level of the image data output by said adding means within the specified range and for outputting said image data to said digital/analogue converting means.

7. An image signal processing apparatus according to claim 5, wherein said delay means is arranged so as to delay the image data output by said analogue/digital conversion means by one sampling period and output the delayed data.

8. An image signal processing apparatus to process an image signal, comprising:
   (a) analogue/digital conversion means for inputting an image signal, for sampling the input image signal at a predetermined sampling frequency, and for forming the image data by digitalizing the sampled signal to be output;
   (b) delay means for delaying the image data output by said analogue/digital conversion means by a predetermined period and for outputting the result;
   (c) correction data generating means for forming correction data by using the differential value between the image data output by said analogue/digital conversion means and the image data output by said delay means and an image data corresponding to said differential value, said correction data generating means including:

differential data forming means for forming a differential value data corresponding to the difference between the image data output by said analogue/digital conversion means and the image data output by said delay means;

non-linear processing means for conducting non-linear processing of the differential value data output by said differential value data forming means; and correction data forming means for forming a correction data from the data having been non-linearly processed by said non-linear processing means;

(d) adding means for adding the image data output by said delay means and the correction data output by said correction data forming means; and (e) digital/analogue conversion means for converting the image data output by said adding means and for outputting the converted data.

9. An image signal processing apparatus according to claim 8, wherein said non-linear processing means includes a memory table which holds plural number of non-linear conversion data corresponding to the differential value data output by said differential value data forming means, and is arranged so as to convert the differential value data output by said differential value data forming means into the non-linear conversion data corresponding to said differential value data among plural number of non-linear conversion data held by said memory table and output the converted data.

10. An image signal processing apparatus according to claim 9, wherein said memory table includes a random access memory.

11. An image signal processing apparatus according to claim 9, wherein said memory table is so arranged that the contents of plural number of non-linear conversion data held by said memory table can be changed arbitrarily.

12. An image signal processing apparatus according to claim 8, wherein said correction data forming means is arranged so as to form the correction data by adding the data non-linearly processed by said non-linear processing means with the data obtained by delaying the data by one sampling period and reversing its phase.

13. An image signal processing apparatus to process an image signal, comprising:

(a) analogue/digital conversion means for inputting an image signal, for sampling the input image signal at a predetermined sampling frequency, for digitalizing it to form image data and for outputting the image data;

(b) delay means for delaying the image data output by said analogue/digital conversion means for a predetermined period and for outputting the delayed image data;

(c) correction signal generating means for calculating differential value data representative of a value of difference between a level represented by the image data output from said analogue/digital conversion means and a level represented by the image data output from said delay means and for forming and outputting a correction signal by performing a non-linear processing on said differential value data;

(d) digital/analogue conversion means for converting the image data output by said delay means into an analogue image signal and for outputting the analogue image signal; and (e) display means in which a forming speed of a scanning line is modulated by the correction signal being output by said correction signal generating means, when said scanning line is formed in correspondence with the analogue image signal output by said digital/analogue conversion means.

14. An image signal processing apparatus according to claim 13, wherein said display means includes a cathode ray tube.

15. An image signal processing apparatus according to claim 13, wherein said delay means is arranged so as to delay the image data output by said analogue/digital converting means by one sampling period and output the delayed data.

16. An image signal processing apparatus to process an image signal, comprising:

(a) analogue/digital conversion means for inputting an image signal, for sampling the input image signal at a predetermined sampling frequency, for digitalizing it to form image data and for outputting the image data;

(b) delay means for delaying the image data output by said analogue/digital conversion means for a predetermined period and for outputting the delayed image data;

(c) correction signal generating means for forming correction data by using the differential value between the image data output by said analogue/digital conversion means and the image data output by said delay means and an image data corresponding to said differential value, said correction signal generating means including:

differential value data forming means for forming the differential value data corresponding to the differential value between the image data output by said analogue/digital conversion means and the image data output by said delay means;

non-linear processing means for conducting non-linear processing of the differential value data output by said differential value data forming means and for outputting the processed data;

correction data forming means for forming correction data from the data having been non-linearly processed by said non-linear processing means; and conversion means for converting the correction data output by said correction data forming means into an analogue correction signal and for outputting the analogue correction signal;

(d) digital/analogue conversion means for converting the image data output by said delay means into an analogue signal and for outputting the analogue signal; and (e) display means in which a forming speed of a scanning line is modulated by the correction signal being output by said correction signal generating means, when said scanning line is formed in correspondence with the image signal output by said digital/analogue conversion means.

17. An image signal processing apparatus according to claim 16, wherein said non-linear processing means includes a memory table which holds plural number of non-linear conversion data corresponding to the differential value data output by said differential value data forming means and is arranged so as to convert the differential value data output by said differential value data forming means into non-linear conversion data corresponding to said differential value data among plural number of non-linear conversion data held at the said memory table and output the converted data.

18. An image signal processing apparatus according to claim 17, wherein said memory table includes a random access memory.

19. An image signal processing apparatus according to claim 17, wherein said memory table is so arranged that the contents of plural number of non-linear conversion data held by said memory table can be changed arbitrarily.

20. An image signal processing apparatus according to claim 16, wherein said correction data forming means is arranged so as to form said correction data by adding the data having been non-linear processed by said non-linear processing means with the data obtained by delaying said data by one sampling period and reversing its phase.

21. An image signal processing apparatus to process an image signal, comprising:
   (a) analogue/digital conversion means for inputting an image signal, for sampling the input image signal at a predetermined sampling frequency, for digitalizing it to form image data and for outputting the image data;
   (b) delay means for delaying the image data output by said analogue/digital conversion means for a predetermined period and for outputting the delayed image data;
   (c) correction signal generating means for forming a correction signal by using the differential value between the image data output by said analogue/digital conversion means and the image data output by said delay means and an image data corresponding to said differential value;
   (d) digital/analogue conversion means for converting the image data output by said delay means into an analogue signal and for outputting the analogue signal; and
   (e) display means in which a forming speed of a scanning line is modulated by the correction signal being output by said correction signal generating means, when said scanning line is formed in correspondence with the image signal output by said digital/analogue conversion means, said display means including:
      modulating means for inputting a sawteeth wave signal, for modulating the input sawteeth wave signal by the correction signal output by said correction signal generating means and for outputting the modulated signal; and
      deflecting means for controlling a scanning speed of the scanning line according to the sawteeth wave signal modulated by said correction signal output by said modulating means.

22. An image signal processing apparatus to process an image signal, comprising,
   (a) analogue/digital conversion means for inputting an image signal, for sampling the input image signal at a predetermined sampling frequency, for digitalizing it to form image data, and for outputting the image data;
   (b) delay means for delaying the image data output by said analogue/digital conversion means for a predetermined period and for outputting the delayed image data;
   (c) correction signal generating means for forming a correction signal by using the differential value between the image data output by said analogue/digital conversion means and the image data output by said delay means and an image data corresponding to said differential value;
   (d) digital/analogue conversion means for converting the image data output by said delay means into an analogue signal and for outputting the analogue signal; and
   (e) display means in which a forming speed of a scanning line is modulated by the correction signal being output by said correction signal generating means, when said scanning line is formed in correspondence with the image signal output by said digital/analogue conversion means, said display means including:
      a cathode ray tube;
         electron beam generating means for generating an electron beam corresponding to the image signal output by said digital/analogue conversion means;
         modulating means for inputting a sawteeth wave signal, for modulating the input sawteeth wave signal by the correction signal output by said correction signal generating means and for outputting the modulated signal; and
         deflecting means for controlling a scanning speed of the electron beam generated by said electron beam generating means according to the sawteeth wave signal modulated by said correction signal output by said modulating means.

* * * * *